United States Patent
Aborn

(10) Patent No.: US 9,338,227 B2
(45) Date of Patent: *May 10, 2016

(54) AUTOMATED MANAGEMENT OF CONTENT SERVERS BASED ON CHANGE IN DEMAND

(75) Inventor: Justin Aborn, Hingham, MA (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 1429 days.

This patent is subject to a terminal disclaimer.

(21) Appl. No.: 12/048,669

(22) Filed: Mar. 14, 2008

(65) Prior Publication Data

US 2008/0162700 A1    Jul. 3, 2008

Related U.S. Application Data

(63) Continuation of application No. 09/969,437, filed on Oct. 2, 2001, now Pat. No. 7,373,644.

(51) Int. Cl.
*G06F 9/46* (2006.01)
*G06F 9/50* (2006.01)
*H04L 29/08* (2006.01)

(52) U.S. Cl.
CPC ........ *H04L 67/1008* (2013.01); *H04L 67/1031* (2013.01); *G06F 9/505* (2013.01); *H04L 67/1002* (2013.01); *H04L 67/1012* (2013.01); *H04L 67/1029* (2013.01)

(58) Field of Classification Search
CPC .......... G06F 9/50; G06F 9/505; G06F 9/5027
See application file for complete search history.

(56) References Cited

U.S. PATENT DOCUMENTS

| | | | |
|---|---|---|---|
| 4,495,570 A | 1/1985 | Kitajima et al. |
| 4,591,983 A | 5/1986 | Bennett et al. |
| 4,594,704 A | 6/1986 | Ollivier |
| 4,726,017 A | 2/1988 | Krum et al. |
| 4,803,641 A | 2/1989 | Hardy et al. |
| 4,839,798 A | 6/1989 | Eguchi et al. |
| 4,847,784 A | 7/1989 | Clancey |
| 4,920,432 A | 4/1990 | Eggers |
| 4,922,417 A | 5/1990 | Churm et al. |
| 4,943,932 A | 7/1990 | Lark et al. |
| 4,949,187 A | 8/1990 | Cohen |
| 4,949,248 A | 8/1990 | Caro |
| 5,029,232 A | 7/1991 | Nall |

(Continued)

FOREIGN PATENT DOCUMENTS

| CA | 2202572 | 10/1998 |
|---|---|---|
| EP | 0800143 A | 10/1997 |

(Continued)

OTHER PUBLICATIONS

Adler, R. M., "Distributed Coordination Models for Client/Server Computing," Computer 28, 4 (Apr. 1995), 14-22.

(Continued)

*Primary Examiner* — Abdullah Al Kawsar
*Assistant Examiner* — Caroline H Arcos

(57) ABSTRACT

Methods and apparatus for detecting a change in demand for server resources across a load-bearing system having one or more content servers hosting identical content, the load-bearing system being connected to a network of content servers; and automatically modifying the number of content servers on the load-bearing system in response to the change in demand.

6 Claims, 5 Drawing Sheets

(56) References Cited

U.S. PATENT DOCUMENTS

| | | |
|---|---|---|
| 5,130,792 A | 7/1992 | Tindell et al. |
| 5,132,992 A | 7/1992 | Yurt et al. |
| 5,136,716 A | 8/1992 | Harvey et al. |
| 5,172,413 A | 12/1992 | Bradley et al. |
| 5,191,573 A | 3/1993 | Hair |
| 5,253,275 A | 10/1993 | Yurt et al. |
| 5,253,341 A | 10/1993 | Rozmanith |
| 5,287,499 A | 2/1994 | Nemes |
| 5,287,537 A | 2/1994 | Newmark et al. |
| 5,291,554 A | 3/1994 | Morales |
| 5,341,477 A | 8/1994 | Pitkin et al. |
| 5,371,532 A | 12/1994 | Gelman |
| 5,410,343 A | 4/1995 | Coddington |
| 5,414,455 A | 5/1995 | Hooper |
| 5,442,389 A | 8/1995 | Blahut |
| 5,442,390 A | 8/1995 | Hooper |
| 5,442,749 A | 8/1995 | Northcutt |
| 5,471,622 A | 11/1995 | Eadline |
| 5,475,615 A | 12/1995 | Lin |
| 5,508,732 A | 4/1996 | Bottomley |
| 5,515,511 A | 5/1996 | Nguyen |
| 5,519,435 A | 5/1996 | Anderson |
| 5,528,281 A | 6/1996 | Grady |
| 5,539,621 A | 7/1996 | Kikinis |
| 5,542,087 A | 7/1996 | Neimat et al. |
| 5,544,313 A | 8/1996 | Shachnai |
| 5,544,327 A | 8/1996 | Dan |
| 5,550,577 A | 8/1996 | Verbiest |
| 5,550,863 A | 8/1996 | Yurt |
| 5,550,982 A | 8/1996 | Long |
| 5,557,317 A | 9/1996 | Nishio |
| 5,572,643 A | 11/1996 | Judson |
| 5,590,288 A | 12/1996 | Castor |
| 5,592,611 A | 1/1997 | Midgely |
| 5,594,910 A | 1/1997 | Filepp et al. |
| 5,603,026 A | 2/1997 | Demers et al. |
| 5,619,648 A | 4/1997 | Canale |
| 5,623,656 A | 4/1997 | Lyons |
| 5,625,781 A | 4/1997 | Cline |
| 5,627,829 A | 5/1997 | Gleeson et al. |
| 5,630,067 A | 5/1997 | Kindell |
| 5,633,999 A | 5/1997 | Clowes |
| 5,634,006 A | 5/1997 | Baugher et al. |
| 5,638,443 A | 6/1997 | Stefik et al. |
| 5,644,714 A | 7/1997 | Kikinis |
| 5,646,676 A | 7/1997 | Dewkett et al. |
| 5,649,186 A | 7/1997 | Ferguson |
| 5,659,729 A | 8/1997 | Nielsen |
| 5,666,362 A | 9/1997 | Chen |
| 5,671,279 A | 9/1997 | Elgamal |
| 5,675,734 A | 10/1997 | Hair |
| 5,682,512 A | 10/1997 | Tetrick |
| 5,699,513 A | 12/1997 | Feigen et al. |
| 5,712,979 A | 1/1998 | Graber et al. |
| 5,715,453 A | 2/1998 | Stewart |
| 5,721,914 A | 2/1998 | DeVries |
| 5,734,831 A | 3/1998 | Sanders |
| 5,740,423 A | 4/1998 | Logan et al. |
| 5,742,762 A | 4/1998 | Scholl |
| 5,751,961 A | 5/1998 | Smyk |
| 5,751,967 A * | 5/1998 | Raab et al. .................... 709/228 |
| 5,761,507 A | 6/1998 | Govett |
| 5,761,663 A | 6/1998 | Lagarde et al. |
| 5,764,906 A | 6/1998 | Edelstein et al. |
| 5,774,660 A | 6/1998 | Brendel et al. |
| 5,774,668 A * | 6/1998 | Choquier et al. ............. 709/223 |
| 5,777,989 A | 7/1998 | McGarvey |
| 5,784,058 A | 7/1998 | LaStrange et al. |
| 5,796,952 A | 8/1998 | Davis |
| 5,799,141 A | 8/1998 | Galipeau et al. |
| 5,802,106 A | 9/1998 | Packer |
| 5,802,291 A | 9/1998 | Balick et al. |
| 5,812,769 A | 9/1998 | Graber et al. |
| 5,815,664 A | 9/1998 | Asano |
| 5,828,847 A | 10/1998 | Gehr |
| 5,832,506 A | 11/1998 | Kuzma |
| 5,832,514 A | 11/1998 | Norin et al. |
| 5,835,718 A | 11/1998 | Blewett |
| 5,845,303 A | 12/1998 | Templeman |
| 5,856,974 A | 1/1999 | Gervais et al. |
| 5,862,339 A | 1/1999 | Bonnaure et al. |
| 5,867,706 A | 2/1999 | Martin et al. |
| 5,867,799 A | 2/1999 | Lang et al. |
| 5,870,546 A | 2/1999 | Kirsch |
| 5,870,559 A | 2/1999 | Leshem et al. |
| 5,878,212 A | 3/1999 | Civanlar et al. |
| 5,884,038 A | 3/1999 | Kapoor |
| 5,890,171 A | 3/1999 | Blumer et al. |
| 5,893,116 A | 4/1999 | Simmonds et al. |
| 5,894,554 A | 4/1999 | Lowery et al. |
| 5,896,533 A | 4/1999 | Ramos et al. |
| 5,903,723 A | 5/1999 | Beck et al. |
| 5,907,704 A | 5/1999 | Gudmundson et al. |
| 5,913,028 A | 6/1999 | Wang et al. |
| 5,913,033 A | 6/1999 | Grout |
| 5,915,095 A * | 6/1999 | Miskowiec .................... 709/223 |
| 5,918,010 A | 6/1999 | Appleman et al. |
| 5,919,247 A | 7/1999 | Van Hoff et al. |
| 5,920,701 A | 7/1999 | Miller et al. |
| 5,933,832 A | 8/1999 | Suzuoka et al. |
| 5,935,207 A | 8/1999 | Logue et al. |
| 5,945,989 A | 8/1999 | Freishtat et al. |
| 5,956,489 A | 9/1999 | San Andres et al. |
| 5,956,716 A | 9/1999 | Kenner |
| 5,958,008 A | 9/1999 | Pogrebisky et al. |
| 5,961,596 A | 10/1999 | Takubo et al. |
| 5,966,440 A | 10/1999 | Hair |
| 5,968,121 A | 10/1999 | Logan et al. |
| 5,978,791 A | 11/1999 | Farber et al. |
| 5,983,214 A | 11/1999 | Lang et al. |
| 5,983,227 A | 11/1999 | Nazem et al. |
| 5,987,606 A | 11/1999 | Cirasole et al. |
| 5,991,809 A | 11/1999 | Kriegsman |
| 6,002,720 A | 12/1999 | Yurt et al. |
| 6,003,030 A | 12/1999 | Kenner et al. |
| 6,006,264 A | 12/1999 | Colby et al. |
| 6,012,090 A | 1/2000 | Chung et al. |
| 6,014,686 A | 1/2000 | Elnozahy et al. |
| 6,014,698 A | 1/2000 | Griffiths |
| 6,018,516 A | 1/2000 | Packer |
| 6,026,440 A | 2/2000 | Shrader et al. |
| 6,029,175 A | 2/2000 | Chow et al. |
| 6,029,176 A | 2/2000 | Cannon |
| 6,035,332 A | 3/2000 | Ingrassia, Jr. et al. |
| 6,038,216 A | 3/2000 | Packer |
| 6,038,310 A | 3/2000 | Hollywood et al. |
| 6,038,610 A | 3/2000 | Belfiore et al. |
| 6,041,324 A | 3/2000 | Earl et al. |
| 6,044,405 A | 3/2000 | Driscoll, III et al. |
| 6,046,980 A | 4/2000 | Packer |
| 6,049,831 A | 4/2000 | Gardell et al. |
| 6,052,718 A | 4/2000 | Gifford |
| 6,052,730 A | 4/2000 | Felciano et al. |
| 6,065,051 A | 5/2000 | Steele et al. |
| 6,065,062 A | 5/2000 | Periasamy et al. |
| 6,070,191 A | 5/2000 | Narendran et al. |
| 6,081,829 A | 6/2000 | Sidana |
| 6,092,112 A | 7/2000 | Fukushige |
| 6,092,204 A | 7/2000 | Baker |
| 6,105,028 A | 8/2000 | Sullivan et al. |
| 6,108,673 A | 8/2000 | Brandt et al. |
| 6,108,703 A | 8/2000 | Leighton et al. |
| 6,112,231 A | 8/2000 | DeSimone et al. |
| 6,112,239 A | 8/2000 | Kenner et al. |
| 6,112,240 A | 8/2000 | Pogue et al. |
| 6,115,357 A | 9/2000 | Packer et al. |
| 6,115,752 A | 9/2000 | Chauhan |
| 6,119,143 A | 9/2000 | Dias et al. |
| 6,125,388 A | 9/2000 | Reisman |
| 6,128,601 A | 10/2000 | Van Horne et al. |
| 6,128,660 A | 10/2000 | Grimm et al. |
| 6,130,890 A | 10/2000 | Leinwand et al. |
| 6,134,583 A | 10/2000 | Herriot |
| 6,144,375 A | 11/2000 | Jain et al. |

(56) References Cited

U.S. PATENT DOCUMENTS

| | | |
|---|---|---|
| 6,144,702 A | 11/2000 | Yurt et al. |
| 6,144,996 A | 11/2000 | Starnes et al. |
| 6,151,624 A | 11/2000 | Teare et al. |
| 6,154,738 A | 11/2000 | Call |
| 6,154,744 A | 11/2000 | Kenner et al. |
| 6,154,753 A | 11/2000 | McFarland |
| 6,154,777 A | 11/2000 | Ebrahim |
| 6,163,779 A | 12/2000 | Mantha et al. |
| 6,167,427 A | 12/2000 | Rabinovich et al. |
| 6,173,311 B1 | 1/2001 | Hassett et al. |
| 6,173,322 B1 | 1/2001 | Hu |
| 6,175,869 B1 | 1/2001 | Ahuja et al. |
| 6,178,160 B1 | 1/2001 | Bolton et al. |
| 6,181,867 B1 | 1/2001 | Kenner et al. |
| 6,185,598 B1 | 2/2001 | Farber et al. |
| 6,185,619 B1 | 2/2001 | Joffe et al. |
| 6,189,030 B1 | 2/2001 | Kirsch et al. |
| 6,205,120 B1 | 3/2001 | Packer et al. |
| 6,226,642 B1 | 5/2001 | Beranek et al. |
| 6,230,196 B1 | 5/2001 | Guenthner et al. |
| 6,243,760 B1 | 6/2001 | Armbruster et al. |
| 6,249,810 B1 | 6/2001 | Kiraly |
| 6,256,675 B1 | 7/2001 | Rabinovich |
| 6,266,699 B1 | 7/2001 | Sevcik |
| 6,269,394 B1 | 7/2001 | Kenner et al. |
| 6,275,470 B1 | 8/2001 | Ricciulli |
| 6,282,569 B1 | 8/2001 | Wallis et al. |
| 6,282,574 B1 | 8/2001 | Voit |
| 6,286,045 B1 | 9/2001 | Griffiths et al. |
| 6,298,041 B1 | 10/2001 | Packer |
| 6,311,214 B1 | 10/2001 | Rhoads |
| 6,314,465 B1 | 11/2001 | Paul et al. |
| 6,314,565 B1 | 11/2001 | Kenner et al. |
| 6,332,195 B1 | 12/2001 | Green et al. |
| 6,338,044 B1 | 1/2002 | Cook et al. |
| 6,347,085 B2 | 2/2002 | Kelly |
| 6,360,256 B1 | 3/2002 | Lim |
| 6,370,571 B1 | 4/2002 | Medin, Jr. |
| 6,370,580 B2 | 4/2002 | Kriegsman |
| 6,374,299 B1 | 4/2002 | Ford et al. |
| 6,405,252 B1 | 6/2002 | Gupta et al. |
| 6,405,257 B1 | 6/2002 | Gersht et al. |
| 6,412,000 B1 | 6/2002 | Riddle et al. |
| 6,412,002 B1 | 6/2002 | Denman et al. |
| 6,415,280 B1 | 7/2002 | Farber et al. |
| 6,421,726 B1 | 7/2002 | Kenner et al. |
| 6,430,618 B1 | 8/2002 | Karger et al. |
| 6,442,549 B1 | 8/2002 | Schneider |
| 6,456,630 B1 | 9/2002 | Packer et al. |
| 6,460,085 B1 | 10/2002 | Toporek et al. |
| 6,473,405 B2 | 10/2002 | Ricciulli |
| 6,480,893 B2 | 11/2002 | Kriegsman |
| 6,484,143 B1 | 11/2002 | Swildens et al. |
| 6,484,204 B1 | 11/2002 | Rabinovich |
| 6,490,580 B1 | 12/2002 | Dey et al. |
| 6,493,707 B1 | 12/2002 | Dey et al. |
| 6,496,856 B1 | 12/2002 | Kenner et al. |
| 6,502,125 B1 | 12/2002 | Kenner et al. |
| 6,502,215 B2 | 12/2002 | Raad et al. |
| 6,505,248 B1 | 1/2003 | Casper et al. |
| 6,529,477 B1 | 3/2003 | Toporek et al. |
| 6,553,413 B1 | 4/2003 | Leighton et al. |
| 6,553,420 B1 | 4/2003 | Karger et al. |
| 6,557,054 B2 | 4/2003 | Reisman |
| 6,564,251 B2 | 5/2003 | Katariya et al. |
| 6,574,612 B1 * | 6/2003 | Baratti et al. ............. 705/59 |
| 6,577,595 B1 | 6/2003 | Counterman |
| 6,581,090 B1 | 6/2003 | Lindbo et al. |
| 6,584,083 B1 | 6/2003 | Toporek et al. |
| 6,591,299 B2 | 7/2003 | Riddle et al. |
| 6,601,084 B1 | 7/2003 | Bhaskaran et al. |
| 6,611,862 B2 | 8/2003 | Reisman |
| 6,625,643 B1 | 9/2003 | Colby et al. |
| 6,636,499 B1 | 10/2003 | Dowling |
| 6,654,344 B1 | 11/2003 | Toporek et al. |
| 6,654,807 B2 | 11/2003 | Farber et al. |
| 6,658,464 B2 | 12/2003 | Reisman |
| 6,665,706 B2 | 12/2003 | Kenner et al. |
| 6,665,726 B1 | 12/2003 | Leighton et al. |
| 6,691,148 B1 | 2/2004 | Loyall et al. |
| 6,694,358 B1 | 2/2004 | Swildens et al. |
| 6,699,418 B2 | 3/2004 | Okada et al. |
| 6,708,137 B2 | 3/2004 | Carley |
| 6,718,328 B1 | 4/2004 | Norris |
| 6,741,563 B2 | 5/2004 | Packer |
| 6,751,673 B2 | 6/2004 | Shaw |
| 6,754,699 B2 | 6/2004 | Swildens et al. |
| 6,754,706 B1 | 6/2004 | Swildens et al. |
| 6,763,388 B1 | 7/2004 | Tsimelzon |
| 6,778,502 B2 | 8/2004 | Ricciulli |
| 6,795,858 B1 | 9/2004 | Jain et al. |
| 6,799,221 B1 | 9/2004 | Kenner et al. |
| 6,801,576 B1 | 10/2004 | Haldeman et al. |
| 6,834,306 B1 | 12/2004 | Tsimelzon |
| 6,842,604 B1 | 1/2005 | Cook et al. |
| 6,859,926 B1 * | 2/2005 | Brenner et al. ............. 718/100 |
| 6,870,851 B1 | 3/2005 | Leinwand et al. |
| 6,874,032 B2 | 3/2005 | Gersht et al. |
| 6,901,604 B1 | 5/2005 | Kiraly |
| 6,915,329 B2 | 7/2005 | Kriegsman |
| 6,928,442 B2 | 8/2005 | Farber et al. |
| 6,934,255 B1 | 8/2005 | Toporek et al. |
| 6,950,623 B2 | 9/2005 | Brown et al. |
| 6,963,980 B1 | 11/2005 | Mattsson |
| 6,963,981 B1 | 11/2005 | Bailey et al. |
| 6,965,890 B1 | 11/2005 | Dey et al. |
| 6,970,432 B1 | 11/2005 | Hankins et al. |
| 6,973,485 B2 | 12/2005 | Ebata et al. |
| 6,973,490 B1 | 12/2005 | Robertson et al. |
| 6,981,050 B1 | 12/2005 | Tobias et al. |
| 6,981,180 B1 | 12/2005 | Bailey et al. |
| 6,996,616 B1 | 2/2006 | Leighton et al. |
| 7,003,572 B1 | 2/2006 | Lownsbrough et al. |
| 7,007,089 B2 | 2/2006 | Freedman |
| 7,010,578 B1 | 3/2006 | Lewin et al. |
| 7,012,900 B1 | 3/2006 | Riddle |
| 7,039,633 B1 | 5/2006 | Dey et al. |
| 7,047,300 B1 | 5/2006 | Oehrke et al. |
| 7,054,935 B2 | 5/2006 | Farber et al. |
| 7,058,706 B1 | 6/2006 | Iyer et al. |
| 7,069,177 B2 | 6/2006 | Carley |
| 7,096,266 B2 | 8/2006 | Lewin et al. |
| 7,103,645 B2 | 9/2006 | Leighton et al. |
| 7,181,523 B2 | 2/2007 | Sim |
| 7,257,817 B2 * | 8/2007 | Cabrera et al. ............. 719/310 |
| 2001/0029525 A1 | 10/2001 | Lahr |
| 2001/0042139 A1 | 11/2001 | Jeffords et al. |
| 2001/0056500 A1 | 12/2001 | Farber et al. |
| 2002/0018449 A1 | 2/2002 | Ricciulli |
| 2002/0023164 A1 | 2/2002 | Lahr |
| 2002/0023165 A1 | 2/2002 | Lahr |
| 2002/0026560 A1 | 2/2002 | Jordan et al. |
| 2002/0032777 A1 | 3/2002 | Kawata et al. |
| 2002/0040404 A1 | 4/2002 | Lahr |
| 2002/0042817 A1 | 4/2002 | Lahr |
| 2002/0046273 A1 | 4/2002 | Lahr et al. |
| 2002/0046405 A1 | 4/2002 | Lahr |
| 2002/0049857 A1 | 4/2002 | Farber et al. |
| 2002/0059592 A1 | 5/2002 | Kiraly |
| 2002/0066038 A1 | 5/2002 | Mattsson |
| 2002/0073199 A1 | 6/2002 | Levine et al. |
| 2002/0078263 A1 | 6/2002 | Darling et al. |
| 2002/0082999 A1 | 6/2002 | Lee et al. |
| 2002/0083124 A1 | 6/2002 | Knox et al. |
| 2002/0099850 A1 | 7/2002 | Farber et al. |
| 2002/0124080 A1 | 9/2002 | Leighton et al. |
| 2002/0129134 A1 | 9/2002 | Leighton et al. |
| 2002/0131645 A1 | 9/2002 | Hamilton |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0163882 A1 | 11/2002 | Bornstein et al. |
| 2002/0166117 A1 | 11/2002 | Abrams et al. |
| 2002/0194350 A1 | 12/2002 | Lu et al. |

(56) References Cited

U.S. PATENT DOCUMENTS

| | | |
|---|---|---|
| 2002/0199016 A1 | 12/2002 | Freedman |
| 2003/0009444 A1 | 1/2003 | Eidler et al. |
| 2003/0018966 A1 | 1/2003 | Cook et al. |
| 2003/0028623 A1 | 2/2003 | Hennessey et al. |
| 2003/0028626 A1 | 2/2003 | Hennessey et al. |
| 2003/0028777 A1 | 2/2003 | Hennessey et al. |
| 2003/0041238 A1 | 2/2003 | French et al. |
| 2003/0055972 A1 | 3/2003 | Fuller et al. |
| 2003/0061263 A1 | 3/2003 | Riddle |
| 2003/0061280 A1 | 3/2003 | Bulson et al. |
| 2003/0065761 A1 | 4/2003 | Cereja et al. |
| 2003/0078888 A1 | 4/2003 | Lee et al. |
| 2003/0078889 A1 | 4/2003 | Lee et al. |
| 2003/0105604 A1 | 6/2003 | Ash et al. |
| 2003/0154279 A1 | 8/2003 | Aziz |
| 2003/0191822 A1 | 10/2003 | Leighton et al. |
| 2004/0022194 A1 | 2/2004 | Ricciulli |
| 2004/0139097 A1 | 7/2004 | Farber et al. |
| 2004/0177148 A1 | 9/2004 | Tsimelzon, Jr. |
| 2005/0033858 A1 | 2/2005 | Swildens et al. |
| 2005/0038851 A1 | 2/2005 | Kriegsman |
| 2005/0100027 A1 | 5/2005 | Leinwand et al. |
| 2005/0114296 A1 | 5/2005 | Farber et al. |
| 2005/0262104 A1 | 11/2005 | Robertson et al. |
| 2006/0143293 A1 | 6/2006 | Freedman |

FOREIGN PATENT DOCUMENTS

| | | |
|---|---|---|
| EP | 0801487 A2 | 10/1997 |
| EP | 0817444 A2 | 1/1998 |
| EP | 0824236 A2 | 2/1998 |
| EP | 0865180 A2 | 9/1998 |
| GB | 2281793 | 3/1995 |
| JP | 07-066829 | 3/1995 |
| JP | 10-027148 | 1/1998 |
| JP | 10-093552 | 4/1998 |
| JP | 10-126445 | 5/1998 |
| JP | 10-171727 | 6/1998 |
| JP | 2001-053793 | 2/2001 |
| WO | WO 96 42041 | 12/1996 |
| WO | WO 97 11429 | 3/1997 |
| WO | WO 97 29423 | 8/1997 |
| WO | WO 98 04985 | 2/1998 |
| WO | WO 98 06033 | 2/1998 |
| WO | WO 99 09726 A | 2/1999 |
| WO | WO 99 29083 A | 6/1999 |
| WO | WO 99 40514 | 8/1999 |
| WO | WO 00 52594 A | 9/2000 |

OTHER PUBLICATIONS

Andresen et al., "SWEB: Towards a Scalable World Wide Web Server on Multicomputers", Proc. IPPS, (Apr. 15, 1996), 850-856.

Andresen, D., et al., Multiprocessor scheduling with client resources to improve the response time of WWW applications, Proc. $11^{th}$ Intl Conf. on Supercomputing (Austria, Jul. 1997). ICS '97. ACM Press, NY, NY, 92-99.

Basturk, E., et al., "Using network layer anycast for load distribution in the Internet", Tech. Rep., IBM T.J. Watson Research Center, 1997 (21 pgs.).

Berners-Lee et al., RFC 1738—"Uniform Resource Locators (URL)", University of Minnesota, Dec. 1994, 1-25.

Bestavros, A., "Speculative Data Dissemination and Service to Reduce Server Load, Network Traffic and Service Time in Distributed Information Systems", In Proc. ICDE '96: The 1996 Int'l Conf. on Data Engineering, (Mar. 1996), 4 pages.

Bestavros, et al., "Server-initiated Document Dissemination for the WWW," IEEE Data Engineering Bulletin 19(3):3-11, Sep. 1996, 1-8.

Bhattacharjee et al., "Application-layer anycasting," in Proc. IEEE INFOCOM '97, 1997, 1-9.

Braun, H., et al., "Web traffic characterization: an assessment of the impact of caching documents from NCSA's web server", Comput. Netw. ISDN Syst. 28, 1-2 (Dec. 1995), 37-51.

Brisco, T. P. RFC 1794: DNS support for load balancing, Apr. 1995, 1-7.

Carter et al., "Dynamic server selection using bandwidth probing in wide-area networks," Tech. Rep. BU-CS-96-007, Comp. Sci. Dept., Boston University, Mar. 1996, 1-20.

Carter et al., Server selection using dynamic path characterization in Wide-Area Networks, IEEE INFOCOM '97, (pp. 1014-1021), 1997, 1-8.

Carter, J. Lawrence et al., "Universal Classes of Hash Functions", Journal of Computer and System Sciences, vol. 18, No. 2, 143-154 (Apr. 1979), 106-112.

Chankhunthod, A. et al., "A Hierarchical Internet Object Cache", Proc. of the 1996 USENIX Technical Conf., Jan. 1996, pp. 153-163.

Cisco Systems, Inc., "Cisco Distributed Director" cisco.com/warp/public/751/distdir/dd_wp.htm, 1997, 16 pages.

Cohen, J., et al., "Cache Array Routing Protocol v1.1", Sep. 29, 1997; tools.ietf.org/id/draft-vinod-carp-v1-01.txt (Last-Modified: Wed, Oct. 1, 1997), 8 pages.

Colajanni, M. and Yu, P. S. 1997. "Adaptive TTL schemes for load balancing of distributed Web servers. SIGMETRICS" Perform. Eval. Rev. 25, 2 (Sep. 1997), 36-42.

"Content Management Technology/Industry News," Content Technologies Trends and Advice, Gilbane Report, News for Jun. 1999 [21 pages].

Cormen, T. H., et al., "Introduction to Algorithms", The MIT Press, Cambridge, Massachusetts, (1990), 219-243, 991-993.

Crovella et al., "Dynamic server selection in the Internet", 3rd IEEE Workshop on the Arch. and Implementation of High Performance Computer Sys. '95, pp. 158-162. Aug. 1995.

Thaler, D. G. and Ravishankar, C. V. 1998. "Using name-based mappings to increase hit rates". IEEE/ACM Trans. Netw. 6, 1 (Feb. 1998), 1-14.

Danzig, P. B., et al., An analysis of wide-area name server traffic: a study of the Internet Domain Name System, Conf. Proc. Communications Architectures & Protocols (Aug. 1992). D. Oran, Ed. SIGCOMM '92. ACM Press, New York, NY, 281-292.

De Bra, P.M.E., et al., "Information Retrieval in the World Wide Web: Making Client-Based Searching Feasible", Computer Networks and ISDN Systems, NL, North Holland Publishing, Amsterdam, vol. 27, No. 2, ISSN: 0169-7552, (Nov. 1, 1994), 183-192.

Deering, S. E., et al, "Multicast routing in datagram internetworks and extended LANs," ACM Trans. Comput. Syst. 8, 2 (May 1990), 85-110.

Devine, R., "Design and Implementation of DDH: A Distributed Dynamic Hashing Algorithm", In Proc. 4th Int'l Conf. on Foundations of Data Organizations and Algorithms, (1993), 101-114.

Doi, K. "Super Proxy Script—How to make distributed proxy servers by URL hashing," Sharp Corp., naragw.sharp.co.jp/sps/, dates unknown (1996-2000), download Jul. 7, 2007.

"Exporting Web Server Final Report," cs.technion.ac.il/Labs/Lccn/projects/spring97/project4/final_report.html, Spring 1997 (downloaded Jul. 7, 2007).

Feeley, M., et al., "Implementing Global Memory Management in a Workstation Cluster", In Proc. $15^{th}$ ACM Symp. on Operating Systems Principles, (1995), 201-212.

Floyd, S., et al., "A Reliable Multicast Framework for Light-Weight Sessions and Application Level Framing", In Proc. of ACM SIGCOMM '95, 342-356, Aug. 1995.

Fox, A., "A Framework for Separating Server Scalability and Availability from Internet Application Functionality", PhD thesis, University of California, Berkeley, 1998, 163 pages.

Fox. A., et al "Cluster-based scalable network services", Proc. 16th ACM Symp. on Operating Systems Principles (Saint Malo, France, Oct. 5-8, 1997). W. M. Waite, Ed. Sosp '97. ACM Press, New York, NY, 78-91.

Fredman, M., et al., "Storing a Sparse Table with 0(1) Worst Case Access Time", J. ACM, vol. 31, No. 3, (Jul. 1984), 538-544.

Goldszmidt, et al., "Load Distribution for Scalable Web Servers: Summer Olympics 1996—A Case Study," In Proc. 8th IFIP/IEEE Int'l Workshop on Distributed Systems: Operations and Management, Sydney, Australia, Oct. 1997, 10 pages.

Grigni, M., et al., "Tight Bounds on Minimum Broadcasts Networks", SIAM J. Disc. Math. 4 (1991), 207-222, (1991) 25 pages.

(56) References Cited

OTHER PUBLICATIONS

Gulbrandsen, A., et al., "A DNS RR for specifying he location of services"(DNS SRV), Network Working Group, RFC 2052, Oct. 1996, 1-10.
Guyton et al., "Locating nearby copies of replicated Internet servers," Proc. ACM SIGCOMM '95, pp. 288-298, 1995, 1-18.
Gwertzman, J., et al., "The Case for Geographical Push-Caching", Proc. Workshop on Hot OS '95, (May 4, 1995), 51-55.
Gwertzman, J., et al., "World-Wide Web Cache Consistency", Proc. 1996 USENIX Tech. Conf., pp. 141-151, San Diego, CA, Jan. 1996, 11 pages.
IBM Technical Disclosure Bulletin,"Local Area Network Server Replacement Procedure", vol. 38, No. 1, (Jan. 1995), 235-236.
Jeffrey et al., Proxy-Sharing Proxy Servers, IEEE, pp. 116-119, 1996, 1-4.
Karger, D., et al., "Consistent Hashing and Random Trees: Distributed Caching Protocols for Relieving Hot Spots on the World Wide Web", in Proc. 29th Annual Acm Symp. on Theory of Computing, (May 1997), 654-663.
Kwan et al., NCSA's World Wide Web Server: Design and Performance, IEEE, pp. 68-74, Nov. 1995, 1-23.
Schemers, R., "Ibnamed—A load balancing name server written in Perl," 1995 LISA IX Sep. 17-22, 1995 Monterey, CA, 1-12.
Litwin, W., et al., "LH*—A Scalable, Distributed Data Structure", ACM Trans. on Database Systems, vol. 21, No. 4, pp. 480-525, 1996, 1-43.
Luotonen et al., World-Wide Web Proxies, CERN, Apr. 1994 (modified May 24, 1994), 1-8.
Malpani, R., et al., "Making World Wide Web Caching Servers Cooperate", in Proc. 4th Int'l. World Wide Web Conf. (Dec. 1995), 10 pages (downloaded from w3.org/Conferences/WWW4/Papers/59/ on Jul. 7, 2007), 10 pages.
Panigrahy, R., "Relieving Hot Spots on the World Wide Web", Master's thesis, MIT EECS, Jun. 1997, pp. 1-66.
Mockapetris et al., "Development of the Domain Name System," Proc. SIGCOMM '88 Computer Communications Review, vol. 18, No. 4, Aug. 1988, 112-122.
Mockapetris, P., RFC 1034: Domain Names—Concepts and Facilities. Nov. 1987, 1-55.
Mockapetris, P., RFC 1035: Domain Names—Implementation and Specification, Nov. 1987, 1-55.
Mourad et al., "Scalable Web Server Architectures," iscc, 2nd IEEE Symposium on Computers and Communications (ISCC '97), 1997, 12-16.

Nisan, N. 1990. Pseudorandom generators for space-bounded computations. In Proc. 22nd Annual ACM Symp. on theory of Computing (Baltimore, MD, U.S., May 13-17, 1990). H. Ortiz, Ed. STOC '90. ACM Press, New York, NY, 204-212.
Oguchi et al., A study of Caching Proxy Mechanisms Realized on Wide Area Distributed Networks, High Performance Distributed Computing, 5th Int'l Symposium, 1996 443-449.
Palmer, M., et al., "Fido: A Cache that Learns to Fetch", In Proc. the 17th Int'l Conf. on Very Large Data Bases, (Sep. 1991), 255-264.
Peleg, D., et al., "The Availability of Quorum Systems", Information and Computation, 123, 210-223, (1995), 31 pages.
Peterson, Eric, "Cisco Takes Global Route", PC Week News, (Feb. 17, 1997), p. 23.
Petri S. et al., "Load Balancing and Fault Tolerance in Workstation Clusters. Migrating Groups of Communicating Processes.", Operating Systems Review, vol. 29, No. 4, Oct. 1995, 25-36.
Plaxton, G. C., et al., "Fast Fault-Tolerant Concurrent Access to Shared Objects", In Proc. 37th IEEE Symp. of Foundations of Computer Science, 570-579, (1996), 10 pages.
J. Postel, "Domain Name System Structure and Delegation", RFC 1591, Mar. 1-7, 1994.
Rabin, M. O., 1989, "Efficient dispersal of information for security, load balancing, and fault tolerance", J. ACM 36, 2 (Apr. 1989), 335-348.
Ross, K.W., "Hash-Routing for Collections of Shared Web Caches", IEEE Network Magazine, 11, 7:37-44, Nov.-Dec. 1997, 1-21.
Schuba, Christoph; "Addressing Weaknesses in the Domain Name System Protocol," COAST Laboratory, Dept. of Computer Sciences, Purdue University; West Layfayette, IN; Aug. 1993, p. 1-87.
Neil Smith, "What can Archives offer the World Wide Web?", Technical Report 11, University of Kent, Computing Laboratory, University of Kent, Canterbury, UK, 1994, 1-12.
Tarjan, Robert E., et al., "Storing a Sparse Table", Commun.ACM, 22, 11, (Nov. 1979), 606-611.
Vitter, J. S., et al., "Optimal Prefetching via Data Compression," Proc. 32nd Annual IEEE Symposium on Foundations of Computer Science (Oct. 1991), 21 pages.
Vixie, Paul; "Name Server Operations Guide for BIND," Internet Software Consortium; La Honda, CA; p. SMM:10-2-SMM:10-30 (undated, 1996), 1-30.
Jeff Walsh, "Global IP/PX Service Should Keep Network Delays Down", Infoworld, (Jan. 20, 1997), 1-2.
Duane Wessels, "Intelligent Caching for World-Wide Web Objects", Masters Thesis, University of Colorado, 1995, 1-84.
Yao, A. C. 1981. "Should Tables Be Sorted?". J. ACM 28, 3 (Jul. 1981), 615-628.

* cited by examiner

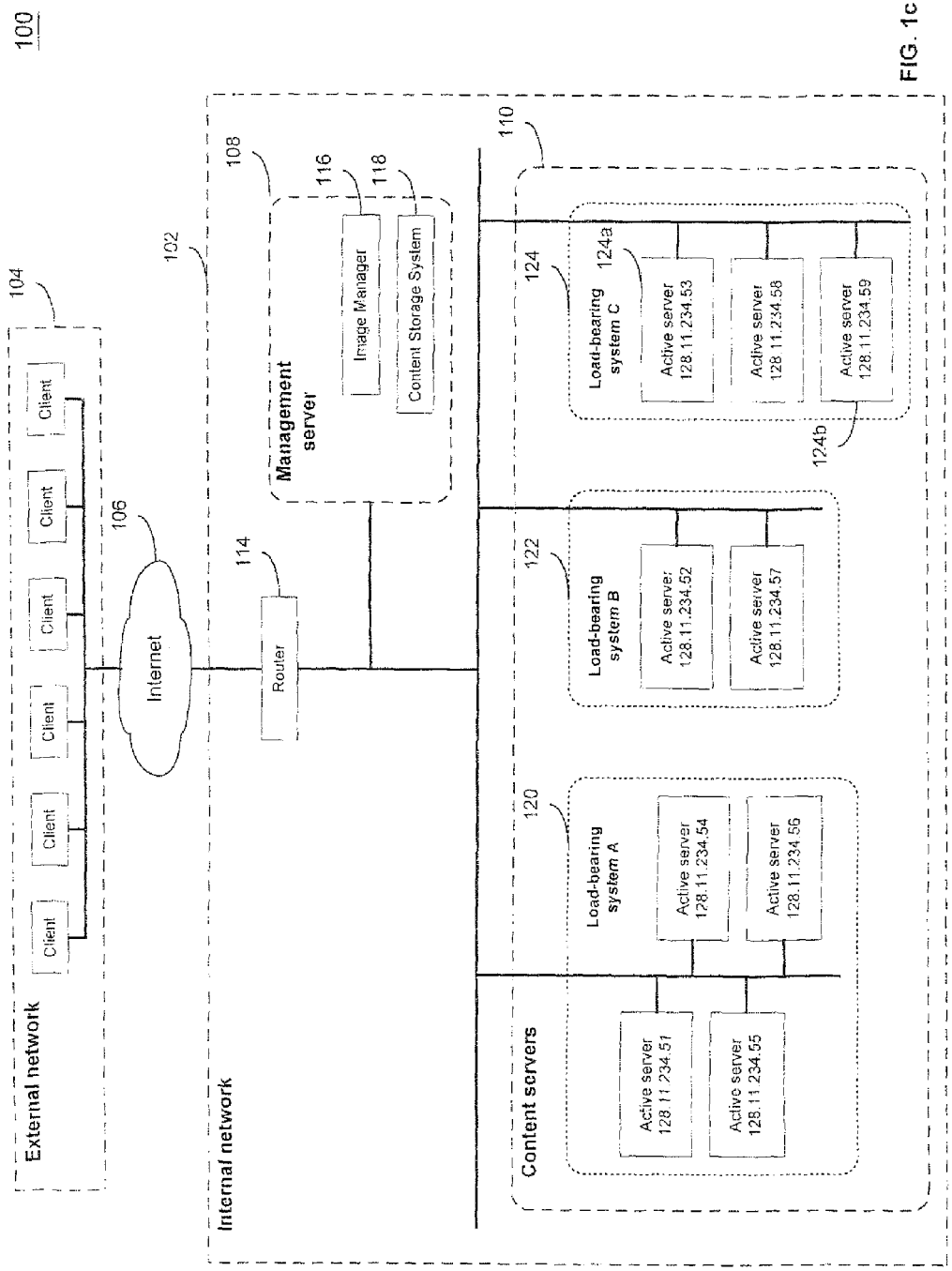

AUTOMATED MANAGEMENT OF CONTENT SERVERS BASED ON CHANGE IN DEMAND

CROSS-REFERENCE TO RELATED APPLICATION

The present application is a continuation of U.S. Nonprovisional application Ser. No. 09/969,437, entitled "AUTOMATED SERVER REPLICATION," filed on 2 Oct. 2001, which is specifically incorporated by reference herein for all that it discloses and teaches.

BACKGROUND

This invention relates to automated server replication.

The popularity of the World Wide Web as a communications medium lies in the richness of its information content and ease of use. Information in this medium exists as objects in a widely distributed collection of internetworked servers, each object uniquely addressable by its own Uniform Resource Locator (URL). The proliferation of commercial applications on the World Wide Web brings with it an increasing number of users making ever-increasing numbers of requests for web content. The problems of latency and bandwidth considerations manifest themselves in delay and lost information.

Network architects respond using an array of solutions, one of which is the server farm. This involves the use of multiple web servers with identical content, or the segmentation based upon functionality. For example, two servers for web functions, two for File Transfer Protocol (FTP), two as a database, and so forth. The use of multiple servers solves one problem at the expense of creating another. If there are multiple servers, how does the end user locate a particular web site? Presently, names and Universal Resource Locator (URLs) are resolved into unique single addresses by a Domain Name Service (DNS) residing in a DNS server. DNS servers maintain a list of domain names cross referenced to individual Internet Protocol (IP) addresses. However, if multiple web servers or server farms are used, a modified version of DNS service is used. A common approach to this problem is to modify the DNS system to be aware of a one-to-many mapping of names-to-IP-addresses. Thus, the DNS will return an IP address that comes from a list of possible IP addresses that correspond to a particular web object. Thus, from one moment to the next, a DNS query will resolve to different IP addresses. In this example, the modified DNS decides which IP address to return based on how busy each of the servers is.

In current network management systems, there are various methods of detecting and monitoring the load across a server or a server farm. One system uses a load capacity detection agent to monitor the load across a server or a server farm. In this system, when the load detection agent detects that a server farm, for example, is experiencing excess load, the agent notifies a system administrator of the system. The system administrator may decide to manually take action to either reduce the load across the server farm, or alternatively, increase the available load capacity by adding a server to the server farm. Generally, the system administrator adds a server by manually identifying an additional available server, and then modifying the entries in the load management system to include the IP address of the recently-added content server.

SUMMARY

In general, in one aspect, the invention provides a method and apparatus, including a computer program apparatus, implementing techniques for detecting a change in demand for server resources across a load-bearing system having one or more content servers hosting identical content, the load-bearing system being connected to a network of content servers; and automatically modifying the number of content servers on the load-bearing system in response to the change in demand.

Each content server on the network may be categorized as active or idle. The hosted content may be assigned a priority level, and a number defining a maximum number of content servers on the load-bearing system. A content server may be added to the load-bearing system if the change in demand is greater than a pre-configured threshold and the number of content servers on the load-bearing system is less than a maximum number assigned to the hosted content. The number of content servers may be modified by selecting an available content server on the network; loading hosted content onto the selected content server; and adding the selected content server to the load-bearing system. All of the content servers on the load-bearing system including the selected content server host identical content. The available content server having the lowest priority level, the highest available load capacity, or the least number of active sessions may be selected.

The hosted content may be assigned a number defining a minimum number of content servers on the load-bearing system. A content server may be removed from the load-bearing system if the change in demand is greater than a pre-configured threshold and the number of content servers on the load-bearing system is greater than a minimum number assigned to the hosted content. The content server having the highest available load capacity or the least number of active sessions may be removed.

Embodiments may have on or more of the following advantages. The invention uses scripting, or other software techniques, to automate the addition or removal of a content server from a load-bearing system. Automating the addition and removal of content servers gives, for example, a web hosting operation a way to manipulate server resources between high-activity servers and low-activity servers without requiring any user intervention. In particular, the invention serves the needs of "seasonal" or "spiky" web applications, such as tax preparation services or Superbowl-related web sites, which experience a tremendous increase in the number of hits at specific times of the year.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 1a-1d are block diagrams illustrating an internetwork topology including an network of content servers and a management server.

Like reference symbols in the various drawings indicate like elements.

DETAILED DESCRIPTION

Figure 1A:
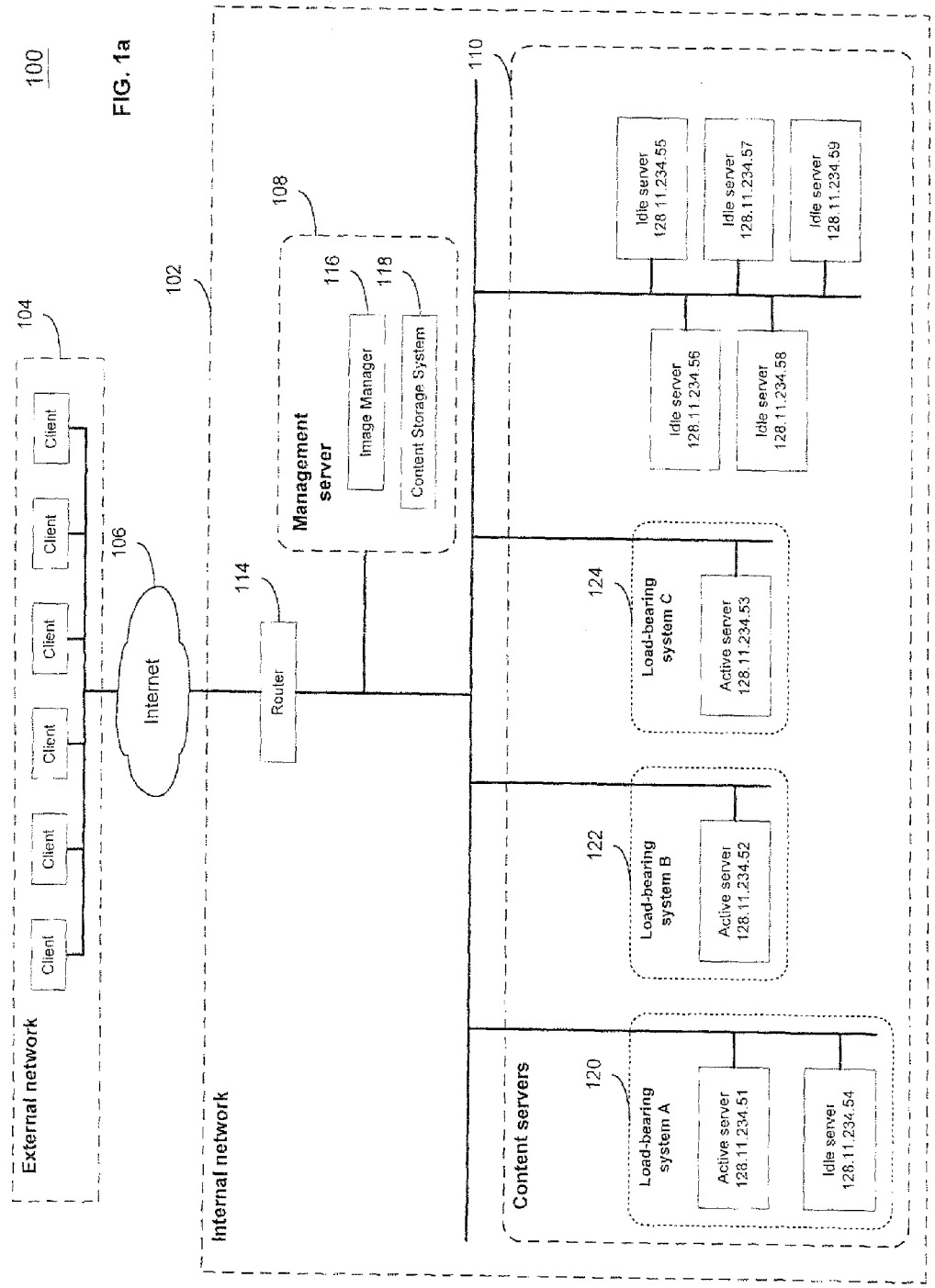

Referring to FIGS. 1a-1d, an exemplary internetwork 100 includes a network of servers 102 connected to a network of clients 104 through the Internet 106. The network of servers 102 includes a management server 108 and a group of content servers 110.

The content servers 110 are nodes on the network 102 that perform the actual serving of content, for example, Web pages or FTP files. Although only nine content servers 110 are shown in FIGS. 1a through 1d, it will be understood that any number of content servers may be connected to the network 102. Each content server 110 is capable of receiving queries from clients, doing substantially all the processing necessary to formulate responses to the queries, and providing these responses to the clients. Web servers, for example, respond to requests from clients (e.g., through browser software) for access to files and data. Other types of servers allow clients to share access to network devices, such as shared printers or disk storage.

In one exemplary commercial setting, each content server 110 is a managed node on the network 102 maintained by a network operator, such as Genuity Inc. of Woburn, Mass. By the term "managed node", it is meant that each content server 110 runs a management process that allows another computer to query the managed node for information. For example, Simple Network Management Protocol (SNMP) describes how a computer formats a message to send to the managed node. Software on the managed node, called an SNMP agent (not shown), examines SNMP messages it receives, and responds accordingly. Each SNMP agent maintains a local database of variables that describe the state of the content server 110 and may, optionally, affect its operation. Each SNMP agent's local database includes, but need not be limited to the following: the number of packets and bytes sent and received from the Internet 106, the number of broadcasts, the current output queue size, the current transaction rate, the current processor utilization, and the current disk utilization.

Content servers 110 are the systems which store information that may be accessed using web browser software such as Netscape Communicator® and Microsoft's Internet Explorer®. Content servers transmit their information in response to receiving a message of a format specified by Hyper Text Transfer Protocol (HTTP). The format of the server's response is also specified by HTTP, and is understood by web browser software.

Network management on the network 102 can be done from management servers, an example of which is shown as management server 108, which are general-purpose computers running management software. The management server 108 interacts with the SNMP agents in the content servers 110 using the SNMP protocol. This protocol allows the management server 108 to query the state of an agent's local variables, and change them if necessary. For example, the management server 108 can issue commands and get responses that allow the management server 108 to monitor the resources available (i.e., available load capacity) on each content server 110, and express them in a way that enables the content servers 110 to be categorized as active or idle. In one example, the management server 108 only considers the CPU resource, and neglects all others. In other implementations, the management server 108 uses a more complex combination of considerations, with load metrics ranging from the instantaneous CPU utilization and IO queue length, through to a linear combination of CPU, memory and IO queue lengths. The management server 108 can also modify network routing tables, and chance the status of network links and devices. The collection of all possible variables available via SNMP is given in a data structure called the Management Information Base (MIB), which is formally defined in the Internet Engineering Task Force (IETF) Request For Comment (RFC) 1213. The IETF is a large open international community of network designers, operators, vendors, and researchers concerned with the evolution of the Internet architecture and smooth operation of the Internet—it is open to any individual.

The management server 108 also houses several other software components, which include in one implementation, an image manager 116, and a content storage system 118. In the illustrated examples on FIGS. 1a-1d, a single server implements the software components of the management server 108. However, it should be noted that two or more servers connected to the network 102 may implement the software components.

The router 114 uses any one of a number of dynamic routing algorithms (e.g., distance vector routing and link state routing) to decide where to send packets addressed to a particular IP address; for example, how to get to a particular content server which are all distinguished based on their assigned IP address. Dynamic routing algorithms change their routing decisions in response to changes in the topology of the network 102. A set of files is stored in the content storage system 118. Each file contains content data, applications and all the necessary software required to implement a web site presence on the Internet 106. Each file can be loaded onto a content server 110 by the image manager 116. In one implementation, the image manager 116 maintains a table (shown below) that includes, for each file, a priority level, a minimum number and a maximum number of content servers 110 that can be used to implement the web site. The priority level indicates to the management server 108 the relative importance—to the network operator, Genuity Inc., for example—of implementating a particular web site in situations in which several web sites are vying for limited server capacity. In one implementation, a five-point scale is used to designate a priority level: "highest", "high", "medium", "low" and "lowest". Generally, the higher the priority level assigned to a file, the more server resources (up to the maximum number of content servers 110 identified in the table) are allocated to implement the web site. By default, content servers 110 that are idle are assigned a "lowest" priority level. When a file having a "highest" priority level is loaded onto a content server 110 that is idle, for example, the priority level of the content server 110 changes from "lowest" to "highest".

Assume, for example, that three files—file "A", file "B", and file "C"—are stored in the content storage system 118. The second, third and fourth table entries are populated with the following data:

| File | Priority Level | Min. Number | Max. Number |
|------|----------------|-------------|-------------|
| A    | highest        | 1           | 7           |
| B    | medium         | 1           | 3           |
| C    | low            | 1           | 3           |

Initially, each file is loaded and run on one or more content servers 110, indicated in dashed lines in FIG. 1a as load-bearing system A 120, load-bearing system B 122, and load-bearing system C 124. If a load-bearing system, such as load-bearing system A 120, has multiple content servers 110, the load on the system is distributed using one of the following schemes: (1) a load-sharing scheme; (2) a load-balancing scheme; or (3) a load-leveling scheme. Generally, content servers 110 in a load-sharing system that utilizes the load-sharing scheme are viewed in binary. That is, the server is either idle or busy, and load may only be placed on idle servers. Load-balancing schemes attempt to ensure that the load on each content server 110 in the system is within a small degree of the load present on every other content server in the system. Load-leveling schemes can be viewed as the middle ground between the load-sharing and load-balancing schemes. Rather than trying to obtain an even distribution across the system, or utilizing only the content servers 110 that are idle, the load-leveling scheme distributes load in a manner that minimizes congestion.

Figure 2:
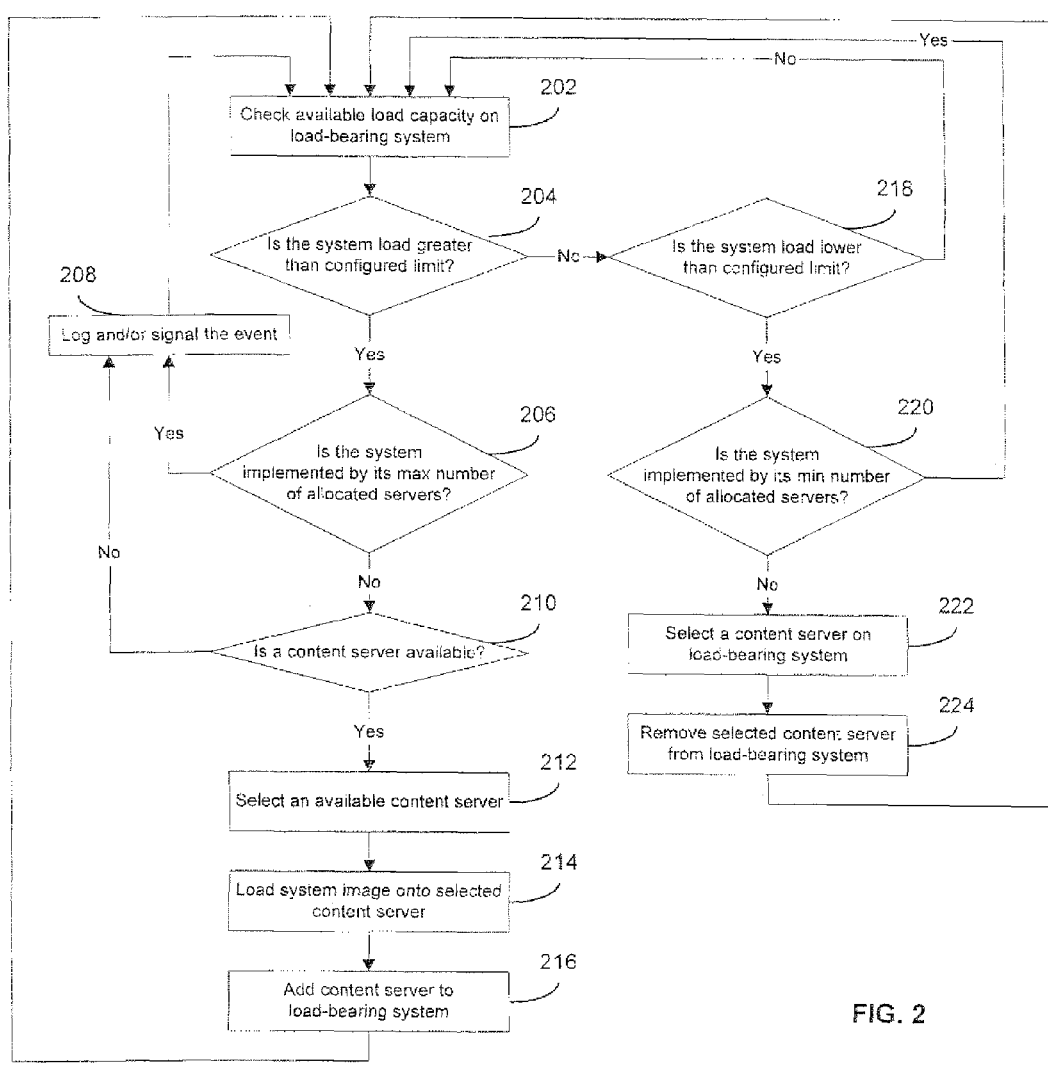
FIG. 2 is a flowchart of a process for automatically modifying the number of content servers on a load-bearing system.

Referring to FIG. 2, a process 200 residing in the management server 108 periodically checks (202) the available load capacity on each load-bearing system. In one implementation, the process 200 polls each content server 110 in a load-bearing system to determine its available load capacity.

Figure 1B:
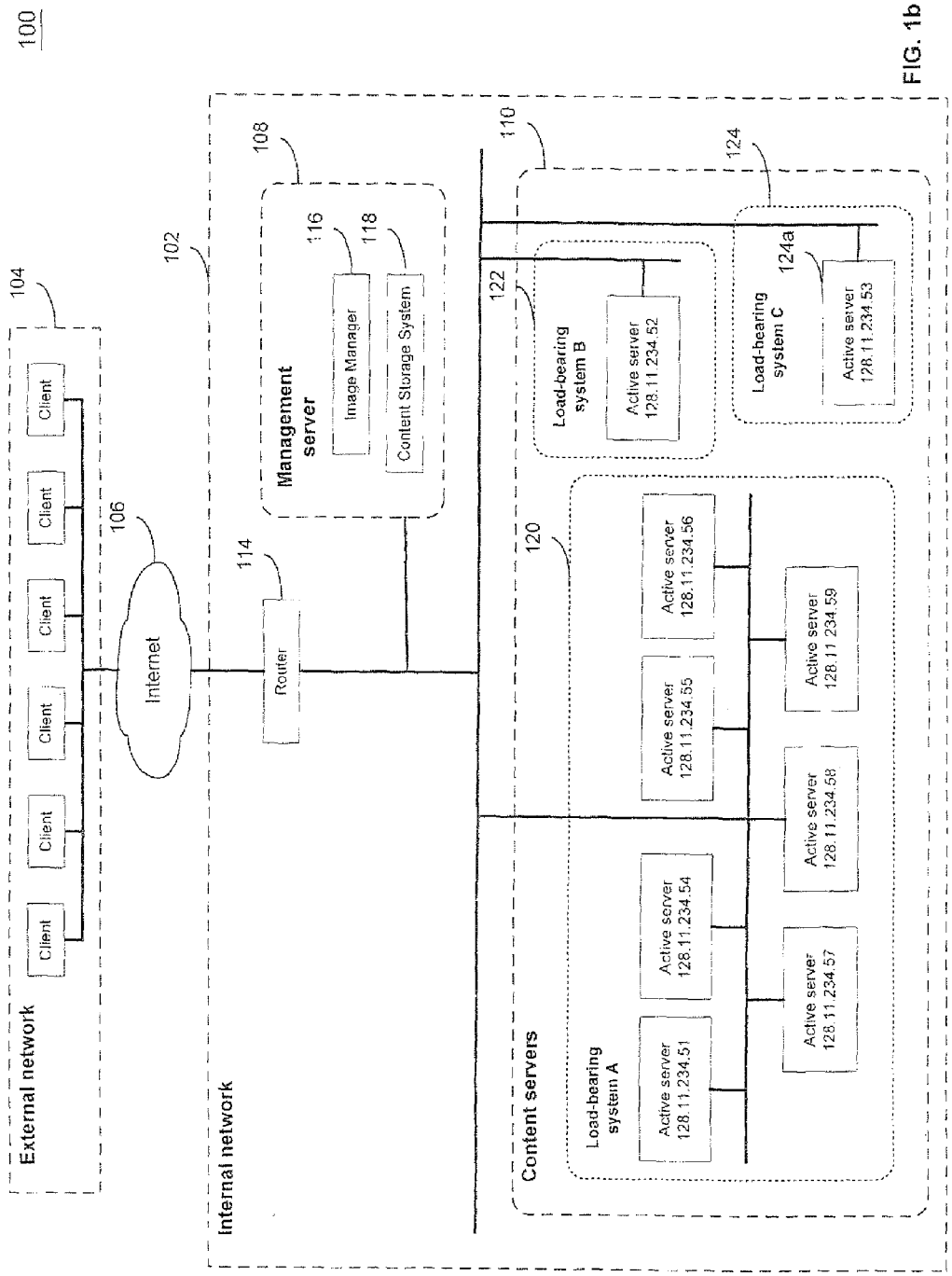

If the process 200 detects (204) that the load on the load-bearing system B 122, for example, is greater than a preconfigured threshold level (i.e., there is insufficient aggregate available load capacity), the process then determines (206) whether the number of content servers 110 in the load-bearing system B 122 is less than the maximum number that may be allocated to that system. If so, the process 200 will add a content server 110 to the load-bearing system B 122 if one is available. By use of the term "available", it is meant that the content server 110 is idle and may be added to a load-bearing system, or alternatively, the content server has a lower priority level and may be removed from a particular load-bearing system and allocated to a different load-bearing system. For example, as shown in FIG. 1*b*, if the load-bearing system C 124 is implemented by a single content server 124*a*, the content server 124*a* is not available for re-allocation to either of the other two load-bearing systems 120 and 122, because the network operator has designated in the table that at least one content server 110 in the network 102 must be allocated to the load-bearing system C 124.

The process 200 first polls all of the content servers 110 on the network 102 to determine (210) if there is an available content server 110 on the network 102. If none of the content servers 110 are available, the process 200 logs and signals the event (208) to the network operator maintaining the network 102. Otherwise, the process 200 selects (212) one of the available content servers for addition to the load-bearing system B 122. If there are multiple available content servers 110, the process 200 will typically select one that is idle for addition to the load-bearing system B 122. However, if all of the available content servers 110 on the network 102 are active, as shown in FIG. 1*c*, the process 200 makes the selection as follows:

(1) If there is only one available content server 110, the process 200 selects that content server 110.
(2) If there are multiple available content servers 110, the process 200 selects the content server 110 having the lowest priority level.
(3) If there are multiple available content servers 110 having the lowest priority level, the process 200 polls each of those content servers 110 to determine which content server 110 has the highest available load capacity and selects that content server 110. Alternatively, the process 200 polls each of those content servers 110 to determine which content server 110 has the least number of running processes in progress (called "active sessions") and selects that content server 110.

Figure 1D:
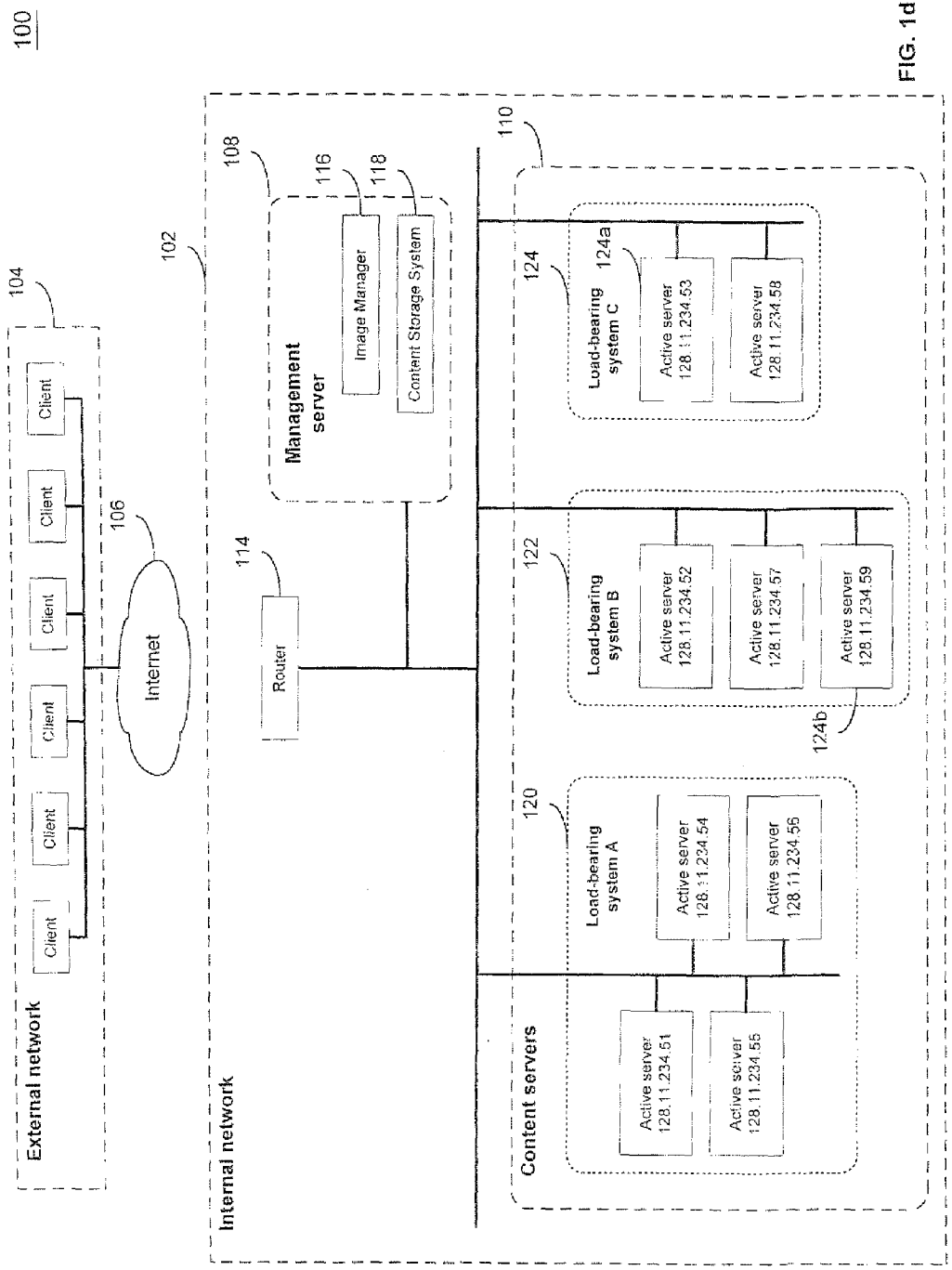

Once the selection is made, say, for example, the process 200 selects the content server having an IP address of "128.11.234.59" 124*b* in the load-bearing system C 124, as shown in FIG. 1*c*, the process 200 can be configured to immediately stop all future client queries directed to the load-bearing system C 124 from being sent to the selected content server 124*b* for processing. The process 200 can also be configured to wait until all of the active sessions on the selected content server 124*b* have been terminated before removing that content server 124*b* from the load-bearing system C 124. Once removed, the process 200 retrieves the file "B" from the content storage system 118 and uses the image manager 116 to load (214) it onto the selected content server 124*b*. Referring to FIG. 1*d*, the process 200 then starts the selected content server 124*b* having the recently-loaded file "B", and modifies the DNS system to add (216) the content server having an IP address of "128.11.234.59" 124*b* to the load-bearing system B 122. Thereafter, when a client requests a service by entering in a web browser the URL for the web site implemented by the load-bearing system B 122, the request can be directed to the content server 124*b*.

Referring to FIG. 1*c*, if the process 200 detects (218) that the load on the load-bearing system B 122, for example, is less than a preconfigured threshold level, the process 200 then determines (220) whether the number of content servers 110 in the load-bearing system B 122 is more than the minimum number that may be allocated to that system 122. If so, the process 200 may select (222) a content server 110 from the load-bearing system B 122 for removal if the aggregate available load capacity of the load-bearing system B, the historical demand for services implemented by the load-bearing system B, as well as damping considerations, among others, warrants removal of a content server. The process 200 selects a content server for removal much in the same manner described above. That is, the selection may be made by polling each of the content servers 110 in the load-bearing system B 122 to determine which content server 110 has the highest available load capacity and selecting that content server 110. Alternatively, the selection may be made by polling each of those content servers 110 to determine which content server 110 has the least number of active sessions and selecting that content server 110. The process 200 can be configured to wait until all of the active sessions on the selected content server 110 have been terminated before removing (224) that content server 110 from the load-bearing system B 122, and categorizing it as idle.

Other embodiments are within the scope of the following claims.

What is claimed is:

1. A method comprising:
   using a computer to detect a change in demand for server resources across a first load-bearing system having one or more content servers hosting content, the first load-bearing system being connected to a network comprising at least a second load-bearing system having a plurality of other content servers;
   automatically modifying the number of content servers on the first load-bearing system in response to the change in demand if a number of the one or more content servers on the first load bearing system is less than a maximum threshold of content servers, wherein the modifying act comprises adding at least one of the other content servers to the first load-bearing system from the second load bearing system;
   determining whether a total number of the other content servers on the second load-bearing system is greater than a minimum threshold of content servers associated with content hosted by the other content servers; and
   if the total number is greater than the minimum threshold of content servers, selecting a content server hosting content of a lowest priority level to be the added content server; and
   if multiple content servers on the second load-bearing system host content of the lowest priority level, selecting a content server having the least number of active sessions among the other content servers hosting content of the lowest priority level on the second load bearing system to be the added content server.

2. A method as recited in claim 1, wherein the selected other content server has the highest available load capacity.

3. A method comprising:

using a computer to detect a change in demand for server resources across a first load-bearing system having one or more content servers hosting content, the first load-bearing system being connected to a network comprising at least a second load-bearing system and a third load-bearing system each having a plurality of other content servers;

in response to the change in demand, if a number of the one or more content servers on the first load bearing system is less than a maximum threshold of content servers, referencing a table to select at least one of the other content servers of the second-load bearing system or the third load-bearing system to add to the first load-bearing system, wherein the table comprises priority information related to content hosted on the other content servers;

referencing the table to determine whether a total number of the other content servers of the second load-bearing system is greater than a minimum threshold of content severs associated with the content hosted by the other content servers of the second load-bearing system; and if the total number is greater than the minimum threshold of content servers, selecting a content server hosting content of a lowest priority level from the at least one of the other content servers from the second load-bearing system to be the added content server; and if multiple content servers on the second load-bearing system host content of the lowest priority level, selecting a content server having a least number of active sessions among the other content servers hosting content of the lowest priority level to be the added content server.

4. A method as recited in claim 3, wherein further comprising:

if the total number of content servers of the second load-bearing system is less than the minimum threshold of other content servers associated with the content hosted by the other content servers of the second load-bearing system, referencing the table to determine whether a total number of the other content servers of the third load-bearing system is greater than a minimum threshold of content servers associated with the content hosted by the other content servers of the third load-bearing system, and if so, selecting the at least one of the other content servers from the third load-bearing system to be the added content server.

5. A method as recited in claim 4, wherein the selecting act comprises:

selecting from the other content servers of the third load-bearing system the content server having the highest available load capacity among the other content servers of the third load-bearing system to be the added content server.

6. A method as recited in claim 3, wherein the selecting act comprises:

selecting from the other content servers of the second load-bearing system the content server having the highest available load capacity among the other content servers of the second load-bearing system to be the added content server.

* * * * *